Figure 1:
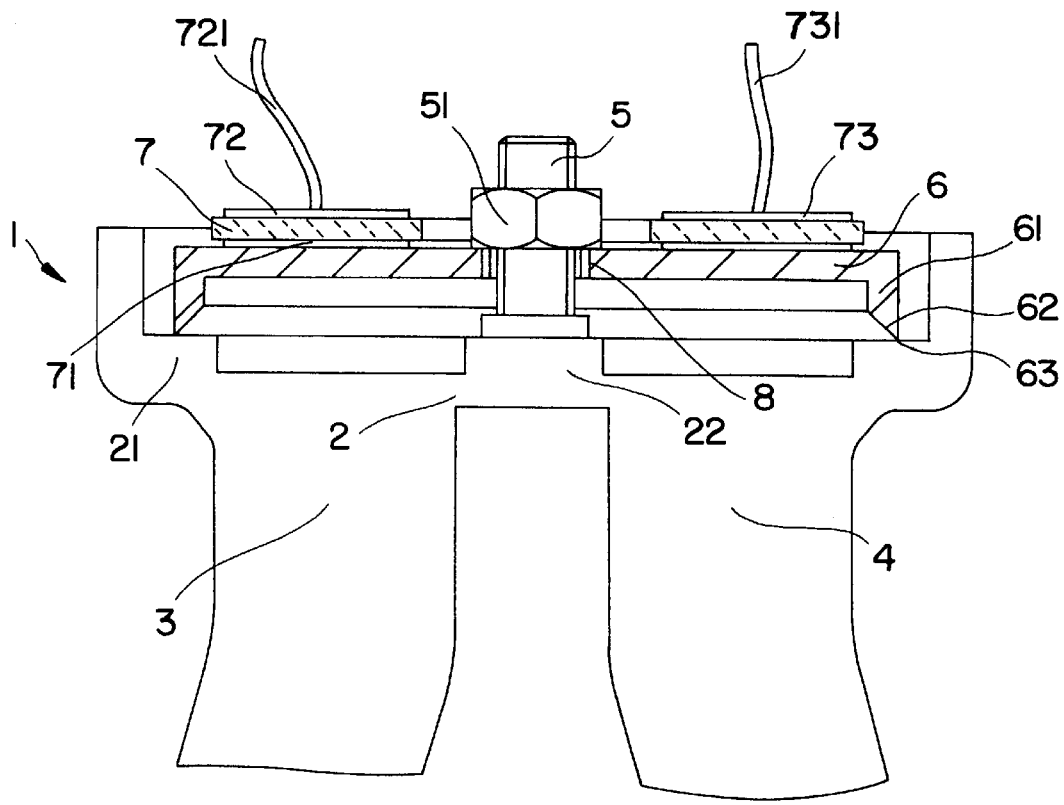

United States Patent
Getman et al.

[11] Patent Number: 5,815,079
[45] Date of Patent: Sep. 29, 1998

[54] DEVICE FOR ESTABLISHING AND/OR MONITORING A PREDETERMINED FILLING LEVEL IN A CONTAINER

[75] Inventors: Igor Getman; Sergej Lopatin, both of Lörrach, Germany

[73] Assignee: Endress + Hauser GmbH + Co., Maulfurg, Germany

[21] Appl. No.: 641,560

[22] Filed: May 1, 1996

[30] Foreign Application Priority Data

Jun. 28, 1995 [DE] Germany .................. 195 23 461.8

[51] Int. Cl.⁶ ........................................ G08B 21/00
[52] U.S. Cl. .............. 340/620; 340/618; 340/621;
73/290 V; 73/290 R; 310/323; 310/324;
200/83 A; 200/83; 200/190
[58] Field of Search ................... 340/618, 620,
340/621; 324/602, 603; 73/290 R, 290 V;
310/323, 324, 328, 330, 331; 200/83 R,
83 F, 83 Y, 182, 190

[56] References Cited

U.S. PATENT DOCUMENTS

| | | | |
|---|---|---|---|
| 3,719,939 | 3/1973 | Gell et al. ........................ | 200/83 Y |
| 4,896,536 | 1/1990 | Benz ................................ | 73/290 V |
| 5,625,343 | 4/1997 | Rottmar .......................... | 340/620 |

FOREIGN PATENT DOCUMENTS

| | | |
|---|---|---|
| 36 25 779 | 2/1988 | Germany . |
| 39 31 453 | 2/1991 | Germany . |
| 39 12 038 | 7/1993 | Germany . |
| 42 03 967 | 8/1993 | Germany . |
| 60-216699 | 10/1985 | Japan . |
| 60-223300 | 11/1985 | Japan . |

*Primary Examiner*—Jeffery A. Hofsass
*Assistant Examiner*—Ashok Mannava
*Attorney, Agent, or Firm*—Bose McKinney & Evans

[57] ABSTRACT

A description is given of a sturdy device for establishing and/or monitoring a predetermined filling level in a container, which device exhibits a housing (1), two oscillating rods (3, 4) projecting into the container, a first diaphragm (2) which is fixedly clamped, at its border, into the housing (1), a second diaphragm (6, 6') which is arranged parallel to said first diaphragm in the interior of the housing (1), a piezoelectric element (7, 7') which is arranged on the second diaphragm (6, 6') and is intended for receiving and converting oscillations into an electric output signal and for inducing bending oscillations in the second diaphragm (6, 6'), and in the case of which device the mode of oscillation produced by the piezoelectric element (7, 7') corresponds to the mode of oscillation utilized for inducing oscillation in the oscillating rods (3, 4).

5 Claims, 2 Drawing Sheets

DEVICE FOR ESTABLISHING AND/OR MONITORING A PREDETERMINED FILLING LEVEL IN A CONTAINER

The invention relates to a device for establishing and/or monitoring a predetermined filling level in a container.

U.S. Pat. No. 5,191,316 gives a description of a device for establishing and/or monitoring a predetermined filling level in a container, which device comprises:

a housing, at least two oscillating rods which project into the container and are fastened on the diaphragm at a distance apart from one another, a diaphragm which is fixedly clamped, at its border, into the housing, and a transducer formed by a stack of components having at least one piezoelectric element which can be excited by an AC voltage for inducing oppositely oriented oscillations in the oscillating rods, transversely with respect to their longitudinal axis, and having at least one piezoelectric element for receiving and converting the mechanical oscillations into an electric output signal, the transformer being fastened by means of a clamping screw which is fastened on that side of the diaphragm which is remote from the oscillation rods, and the diaphragm being prestressed in the process, and the transformer exhibiting, at both ends of the stack, in each case one metal ring, of which the metal ring which faces the diaphragm is provided with pressure studs which transmit to the diaphragm the change in height of the stack produced by the transformer.

The metal rings serve to transmit in parallel, to the piezoelectric elements, the surface pressure produced by the fastening of the stack.

Such a device has, inter alia, the disadvantage that the originally produced mode of oscillation, namely the thickness oscillation, does not correspond to the mode of oscillation which is utilized for inducing oscillation in the oscillating rods, namely a bending oscillation. A comparatively large number of components are necessary in order to convert the mode of oscillation.

DE-A 36 25 779 gives a description of another device for establishing a predetermined filling level in a container, which device comprises:

a housing, which comprises a solid screw-in piece with an axial inner bore and a tubular housing section which has thinner walls than the latter, an inner oscillating rod which projects into the container, an outer oscillating rod which engages around said inner oscillating rod coaxially and projects into the container, a first diaphragm which is clamped, at its border, into the housing and on which the outer oscillating rod is fastened, a second diaphragm which is arranged parallel to the first diaphragm in the interior of the housing and on which the inner oscillating rod is fastened, means for inducing bending oscillations in the second diaphragm and for receiving and converting the oscillations thereof into an electric output signal, the oscillations of the second diaphragm being transmitted directly to the inner oscillating rod and indirectly, via the housing, to the first diaphragm and from the latter to the outer oscillating rod, such that the oscillating rods effect oppositely oriented oscillations transversely with respect to their longitudinal axis.

A disadvantage of such a device is that the two diaphragms are clamped into the housing. On account of this type of fastening and mechanical coupling, so much energy has to be supplied for inducing oscillation that virtually the entire tubular housing section also moves with each oscillation.

Furthermore, it is also conventional to induce bending oscillations in a diaphragm with oscillating rods integrally formed thereon, in that a piezoelectric element is fastened, e.g. adhesively bonded, directly on the diaphragm. However, such a fastening is very sensitive since over-expansion of the diaphragm, e.g. by the oscillating rods being pushed together incorrectly, results in the piezoelectric element being destroyed or at least in the electric and the mechanical connections between the piezoelectric element and the diaphragm being impaired. In this case, a high degree of outlay is required in order to exchange the piezoelectric element.

The object of the invention is to specify a sturdy device for establishing and/or monitoring a predetermined filling level in a container, which device exhibits a direct mechanical coupling between the elements producing the oscillations and the diaphragm on which the oscillating rods are fastened, and in the case of which device the mode of oscillation produced by the piezoelectric element corresponds to the mode of oscillation utilized for inducing oscillation in the oscillating rods.

For this purpose, the invention is a device for establishing and/or monitoring a predetermined filling level in a container, which device comprises:

a housing, two oscillating rods projecting into the container, a first diaphragm which is fixedly clamped, at its border, into the housing and on which the oscillating rods are fastened at a distance apart from one another, a second diaphragm which is arranged parallel to the first diaphragm in the interior of the housing, fastening means which are arranged on the border and in the center of the second diaphragm and via which the second diaphragm is coupled directly in a mechanical manner to the first diaphragm, a single piezoelectric element which is arranged on the second diaphragm, is in the form of a disk or annular disk, and is intended for inducing bending oscillations in the second diaphragm and for receiving and converting the oscillations thereof into an electric output signal, the oscillations of the second diaphragm being transmitted directly, via the fastening means, to the first diaphragm and from the latter to the oscillating rods, such that the oscillating rods effect oppositely oriented oscillations transversely with respect to their longitudinal axis.

According to an advantageous configuration of the invention, the fastening means are a coupling ring, which is integrally formed on the second diaphragm and rests on the first diaphragm, and a clamping screw, which is fastened in the center of the first diaphragm, projects into the interior of the housing, passes through the second diaphragm and the piezoelectric element and by means of which, in conjunction with a nut, the second diaphragm is fixed on the first diaphragm. Instead of the nut, the second diaphragm may also exhibit an internal thread by means of which it is screwed onto the clamping screw.

According to another advantageous configuration of the invention, the fastening means are an external thread, which is located on the second diaphragm and is screwed into an internal thread of the housing, and a stub, which is integrally formed on in the center of the second diaphragm, on that side of the latter which faces the first diaphragm, and in the case of which device the second diaphragm is screwed into the housing to such an extent that the first diaphragm is prestressed.

According to a further configuration of the invention, the piezoelectric element exhibits three electrodes, of which a first electrode, which is connected to the housing, is arranged on a first circular or annular surface of the piezoelectric element, a second electrode, which is connected to an AC voltage source, is arranged on a second circular or annular surface of the piezoelectric element, and a third electrode, which serves to pick off the output signals, is arranged on the second circular or annular surface of the piezoelectric element.

When, once the device is in the installed state, the oscillating rods are covered by the substance or substances filling the container, then the oscillations thereof are damped. The resonant frequency of the entire system and the oscillation amplitude of the oscillating rods thus change. The electric output signal is fed to evaluation electronics. If the resonant frequency and/or the oscillation amplitudes fall below a fixed reference value, this is detected by the evaluation electronics and indicated and/or used for the performance of a switching operation.

An advantage of the invention consists in the fact that bending oscillations are induced in the piezoelectric element just as in the two diaphragms. The conversion of thickness oscillations into bending oscillations is dispensed with.

Another advantage of the invention consists in the fact that, by virtue of the direct mechanical coupling of the two diaphragms, low-loss transmission of the oscillation energy takes place.

A further advantage of the invention consists in the fact that only a very small amount of oscillation energy is transmitted to the housing, since the first diaphragm is fixedly clamped into the housing and the transmission of the oscillation energy from the second diaphragm to the first diaphragm does not take place via the housing.

The invention and further advantages will now be explained in more detail with reference to the figures in the drawing, two exemplary embodiments being represented in said figures; like elements are provided with like reference numerals in the figures.

Figure 2:
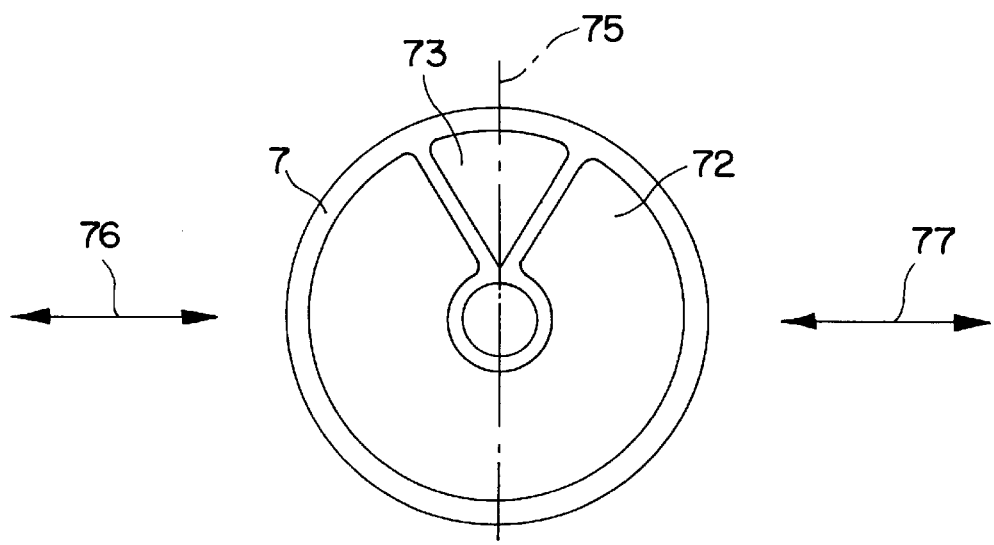
Figure 3:
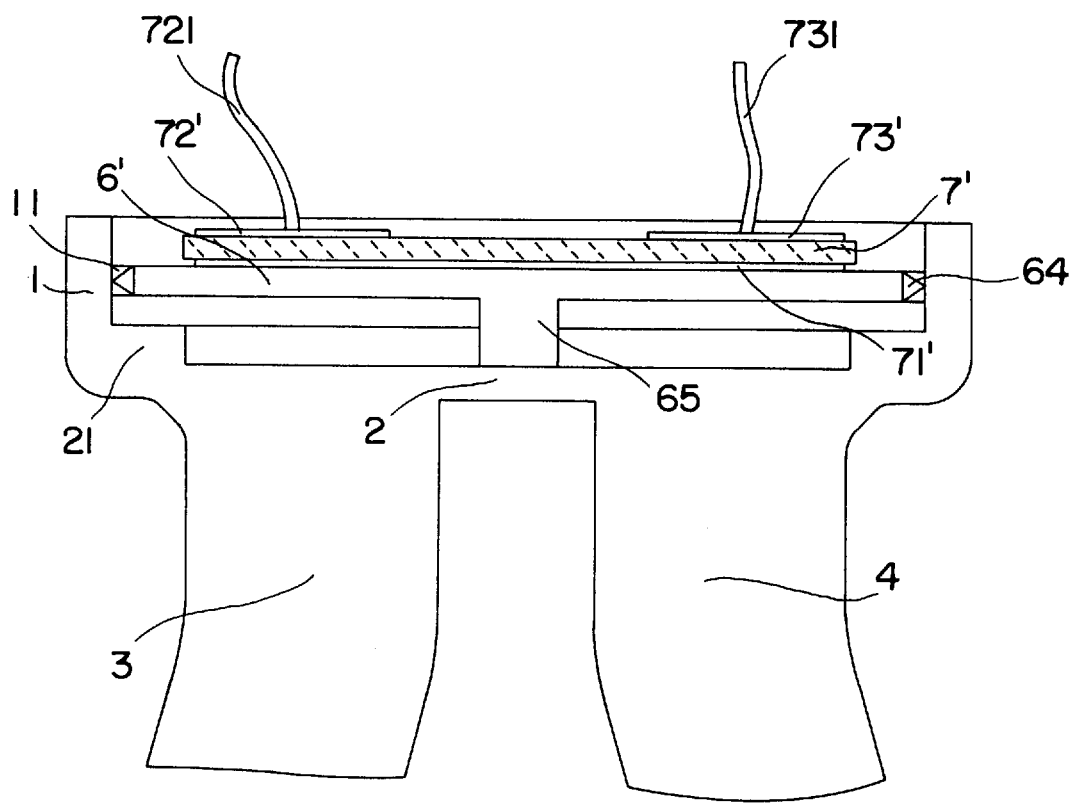

FIG. 1 shows, in longitudinal section, the parts of a device which are fundamental to the invention, FIG. 2 shows the arrangement of electrodes on a piezoelectric element according to FIG. 1, and FIG. 3 shows, in longitudinal section, the parts of a further device which are fundamental to the invention.

FIG. 1 represents, in longitudinal section, only those parts of a device which are fundamental in differentiating the invention from the prior art. The device exhibits a rotationally symmetrical metallic housing 1. The latter is fastened in an opening of a container (not shown) by an external thread being integrally formed, for example, on the housing 1, which external thread is intended to be screwed into the container. On the side which faces the container, the housing 1 is terminated by a first diaphragm 2, to which two oscillating rods 3, 4 projecting into the container are fixedly connected by their ends in each case and at a distance apart from one another. The diaphragm 2, oscillating rods 3, 4 and at least one section of the housing 1 which directly adjoins the diaphragm 2 are preferably made of a single casting. A further housing section (not shown in the figure) is fixedly connected, e.g. welded, to the rest of the housing 1.

On the side which faces the housing interior, the diaphragm 2 exhibits, on its outer border, a stepped ring 21. Consequently, the rigidity of the diaphragm 2 is increased, and the latter is fixedly clamped in. As a result, only a very small amount of oscillation energy is transmitted to the housing 1.

Located in the interior of the housing 1 is a second diaphragm 6 which is, for example, in the form of an annular disk, arranged parallel to the first diaphragm 2 and on the border of which a tubular coupling piece 61 is integrally formed on in a flush manner. The free end 62 of the coupling piece 61 is bevelled toward the tube interior, with the result that the coupling ring 61 rests on the first diaphragm 2 merely by means of an outer annular edge 63.

The second diaphragm 6 and the coupling piece 61 consist of an electrically conductive material, e.g. a suitable metal such as stainless steel.

A piezoelectric element 7 in the form of an annular disk is fixed, e.g. adhesively bonded or soldered, on the second diaphragm 6. On the side which faces the diaphragm, said piezoelectric element exhibits a first electrode 71 which is in the form of an annular disk and electrically connects the piezoelectric element to the second diaphragm 6 and, via the coupling piece 61 and the first diaphragm 2, to the housing 1. Located on that annular-disk surface of the piezoelectric element 7 which is remote from the diaphragm are a second electrode 72, which can be connected to an AC voltage source (not shown) via a feedline 721, and a third electrode 73, which can be connected to evaluation electronics (not shown) via a further line 731.

FIG. 2 shows a plan view of that side of the piezoelectric element 7 which is remote from the diaphragm. The second electrode 72 is in the form of a reflex-angle ring segment. The third electrode 73 is in the form of an acute-angle circle segment. There is no contact between the electrodes 72, 73. The axis of symmetry 75 of the arrangement of the two electrodes 72, 73 runs perpendicularly with respect to the deflection direction of the oscillating rods, this direction being indicated by the arrows 76, 77.

A clamping screw 5, which projects into the housing interior, is fastened in the center of the first diaphragm 2. In the exemplary embodiment shown in FIG. 1, the clamping screw 5 is welded onto a step 22 which is integrally formed on in the center of the diaphragm 2 and is in the form of a disk. Said step protects the thin, and thus sensitive, diaphragm 2 during the welding operation. The clamping screw 5 passes through the second diaphragm 6 and the piezoelectric element 7. There is no mechanical contact between the clamping screw 5 and the housing 1. By means of a nut 51 which is screwed onto the clamping screw 5, against the second diaphragm 6, the first diaphragm 2 is prestressed slightly and the edge 63 of the coupling piece 61 cuts into the stepped ring 21 of the diaphragm 2. There is no electrical contact between the nut 51 and the two electrodes 72, 73. An insulation ring 8 is located in the central opening of the piezoelectric element 7. Said ring is, for example, a plastic ring which is adhesively bonded into the opening.

The function of the nut 51 may also be fulfilled by an internal thread which is provided in the center of the second diaphragm 6 and by means of which the diaphragm 6 is screwed onto the clamping screw 5.

The piezoelectric element 7 exhibits a polarization in the axial direction. It inherently changes its thickness in dependence on a voltage difference present in the axial direction.

If an AC voltage is present, then the thickness oscillates. If the thickness increases, then the diameter of the piezoelectric element 7 decreases; if the thickness decreases, then the diameter increases correspondingly.

On account of this oscillation behavior of the piezoelectric element 7, a voltage difference has the effect, when said element is installed into the device, of bending the composite element formed by the piezoelectric element and the second diaphragm 6, the size of the fastening surface between the piezoelectric element 7 and the second diaphragm 6 remaining constant.

If a voltage difference which effects an inherent increase in diameter of the piezoelectric element 7 is present, then the center of the bending, i.e. at least one point of intersection of the vertical with the fastening surface, is on that side of the piezoelectric element 7 which faces the diaphragm. If a voltage difference which effects an inherent decrease in the diameter of the piezoelectric element 7 is present, then the center of the bending is on that side of the piezoelectric element which is remote from the diaphragm.

If an AC voltage is applied to the piezoelectric element 7, then the composite element performs bending oscillations of which the loop of oscillation is located in the center thereof. This bending oscillation is transmitted to the first diaphragm 2 by the clamping screw 5 and the coupling ring 61. The two diaphragms 2, 6 perform in-phase oscillations.

The oscillation energy is utilized directly for producing the desired mode of oscillation, namely a bending oscillation. A single piezoelectric element is sufficient to produce the oscillations.

On account of the bending oscillations of the diaphragm 2, the oscillating rods 3, 4 fixed on the first diaphragm 2 effect oppositely oriented oscillations transversely with respect to their longitudinal axis. On account of said oscillations being oriented in different directions, the alternating forces exerted by each oscillating rod on the diaphragm 2 cancel out. This means that the clamping is subjected to low mechanical loading, and no oscillation energy is transmitted to the housing 1.

Moreover, the device is not adversely affected by the oscillating rods 3, 4 being pressed together incorrectly. This does not result in additional mechanical stressing on the fastening surface between the piezoelectric element 7 and the second diaphragm 6 since the coupling ring 61 merely rests on the first diaphragm 2.

It is very simple to assemble the device since all that is required is to fit the second diaphragm 6 onto the clamping screw 5 and tighten the nut 51.

Furthermore, the composite element may be easily exchanged at any time.

FIG. 3 represents, in longitudinal section, the fundamental parts of another device. It is only the fastening means by which the second diaphragm is fixed on the first diaphragm which render this device different from the variant represented in FIG. 1.

In the center of a second diaphragm 6' in the form of a disk, a cylindrical stub 65 is integrally formed on the side which faces the first diaphragm 2. The second diaphragm 6' exhibits an external thread 64 which is screwed into an internal thread 11 of the housing 1, the diaphragm 6' being screwed into the housing 1 to such an extent that the first diaphragm 2 is prestressed slightly.

In this exemplary embodiment, use is made of a piezoelectric element 7' in the form of a disk. Disk-like piezoelectric elements 7' are more cost-effective and slightly more sturdy than those in the form of annular disks. Electrodes 71', 72' in the form of disks and circle segments, respectively, are used here instead of the electrodes 71, 72, in the form of annular disks and ring segments, respectively, of the exemplary embodiment of FIG. 1.

The insulation 8, which is required in the exemplary embodiment represented in FIG. 1, of the piezoelectric element 7 and of the electrodes 72, 73 in FIG. 1 with respect to the clamping screw 5 is dispensed with.

The mode of oscillation produced is identical to that in the case of the device of FIG. 1. However, the oscillations are transmitted by the stub 65 alone. The diaphragm 6 is fixedly clamped into the housing 1 by the screw-connection, with the result that only a very small amount of oscillation energy is taken up by the housing 1. For this reason, the housing wall exhibits a much higher degree of mechanical rigidity than the diaphragm 6. The task of isolating the oscillation from the housing is additionally assisted by the stepped ring 21 integrally formed on the diaphragm 2.

We claim:

1. A device for establishing and/or monitoring a predetermined filling level in a container, which device comprises:

a housing (1), two oscillating rods (3, 4) projecting into the container, a first diaphragm (2) which is fixedly clamped, at its border, into the housing (1) and on which the oscillating rods (3,4) are fastened at a distance apart from one another, a second diaphragm (6, 6') which is arranged parallel to the first diaphragm (2) in the interior of the housing (1), fastening means which are arranged on the border and in the center of the second diaphragm (6, 6') and via which the second diaphragm (6, 6') is coupled directly in a mechanical manner to the first diaphragm (2), a single piezoelectric element (7, 7') which is arranged on the second diaphragm (6, 6'), is in the form of a disk or annular disk, and is intended for inducing bending oscillations in the second diaphragm (6, 6') and for receiving and converting the oscillations thereof into an electric output signal, the oscillations of the second diaphragm (6, 6') being transmitted directly, via the fastening means, to the first diaphragm (2) and from the latter to the oscillating rods (3, 4), such that the oscillating rods (3, 4) effect oppositely oriented oscillations transversely with respect to their longitudinal axis.

2. The device as claimed in claim 1, in the case of which the fastening means are a coupling ring (61), which is integrally formed on the second diaphragm (6) and rests on the first diaphragm (2), and a clamping screw (5), which is fastened in the center of the first diaphragm (2), projects into the interior of the housing (1), passes through the second diaphragm (6) and the piezoelectric element (7) and by means of which, in conjunction with a nut (51), the second diaphragm (6) is fixed on the first diaphragm (2).

3. The device as claimed in claim 1, in the case of which the fastening means are a coupling ring (61), which is integrally formed on the second diaphragm (6) and rests on the first diaphragm (2), and a clamping screw (5), which is fastened in the center of the first diaphragm (2), projects into the interior of the housing (1), and passes through the second diaphragm (6) and the piezoelectric element (7), and in the case of which device the second diaphragm (6) exhibits, in its center, an internal thread which is screwed to the clamping screw (5).

4. The device as claimed in claim 1, in the case of which the fastening means are an external thread (64), which is located on the second diaphragm (6') and is screwed into an internal thread (11) of the housing (1), and a stub (65), which is integrally formed on in the center of the second diaphragm (6'), on that side of the latter which faces the first diaphragm (2), and in the case of which device the second diaphragm (6') is screwed into the housing (1) to such an extent that the first diaphragm (2) is prestressed.

5. The device as claimed in claim 1, in the case of which the piezoelectric element (7, 7') exhibits three electrodes (71, 71', 72, 72', 73), of which

- a first electrode (71, 71'), which is connected to the housing (1), is arranged on a first circular or annular surface of the piezoelectric element (7, 7'),
- a second electrode (72, 72'), which is connected to an AC voltage source, is arranged on a second circular or annular surface of the piezoelectric element (7, 7'), and
- a third electrode (73), which serves to pick off the output signal, is arranged on the second circular or annular surface of the piezoelectric element (7, 7').

* * * * *